US010953743B2

(12) United States Patent
Boecker et al.

(10) Patent No.: US 10,953,743 B2
(45) Date of Patent: Mar. 23, 2021

(54) SADDLE TANK WITH SWASH BARRIER

(71) Applicant: TI Automotive Technology Center GmbH, Rastatt (DE)

(72) Inventors: Albert J. Boecker, Ettlingen (DE); Alex Ehler, Rastatt (DE); Thorsten Schaefer, Landau Landau (DE)

(73) Assignee: TI AUTOMOTIVE TECHNOLOGY CENTER GMBH, Rastatt (DE)

( * ) Notice: Subject to any disclaimer, the term of this patent is extended or adjusted under 35 U.S.C. 154(b) by 270 days.

(21) Appl. No.: 15/771,614

(22) PCT Filed: Oct. 21, 2016

(86) PCT No.: PCT/EP2016/075379
§ 371 (c)(1),
(2) Date: Apr. 27, 2018

(87) PCT Pub. No.: WO2017/072041
PCT Pub. Date: May 4, 2017

(65) Prior Publication Data
US 2018/0319273 A1 Nov. 8, 2018

(30) Foreign Application Priority Data
Oct. 31, 2015 (DE) .................. 10 2015 221 366.8

(51) Int. Cl.
*B60K 15/077* (2006.01)
*B60K 15/03* (2006.01)
(52) U.S. Cl.
CPC .......... *B60K 15/077* (2013.01); *B60K 15/03* (2013.01); *B60K 2015/03118* (2013.01);
(Continued)

(58) Field of Classification Search
CPC .................. B60K 15/077; B60K 15/03; B60K 2015/0775; B60K 2015/03118;
(Continued)

(56) References Cited

U.S. PATENT DOCUMENTS

| 2,530,819 A | * | 11/1950 | Hamlin | .................. | B60K 15/00 |
| | | | | | 220/23.83 |
| 2,557,250 A | * | 6/1951 | Baerwald | ............... | B60K 15/00 |
| | | | | | 280/830 |

(Continued)

FOREIGN PATENT DOCUMENTS

| DE | 10 2004 051890 A1 | 4/2006 |
| DE | 10 2007 039861 A1 | 2/2009 |
| DE | 10 2014 202361 A1 | 8/2015 |

OTHER PUBLICATIONS

International Search Report for International Application No. PCT/EP2016/075379, dated Jan. 20, 2016, 2 pgs.

(Continued)

*Primary Examiner* — Ernesto A Grano
(74) *Attorney, Agent, or Firm* — Dickinson Wright PLLC

(57) ABSTRACT

The present disclosure relates to a saddle tank for motor vehicles, having two chambers connected to one another in their upper region via a central portion having a reduced cross-section, wherein the first chamber has an access opening for refueling and wherein a fill level-limiting valve is arranged in the second chamber. In order to prevent unwanted swash-over of fuel from the first chamber into the second chamber, provision is made according to the invention for there to be arranged, between the two chambers, a separating body which has a separating wall, which extends over the entire width of the central portion between an upper and a lower wall portion, and a pipe which extends from an (Continued)

opening in the separating wall into the first chamber and allows fluid communication between the first and the second chamber.

4 Claims, 5 Drawing Sheets

(52) U.S. Cl.
CPC ............ *B60K 2015/03131* (2013.01); *B60K 2015/03144* (2013.01); *B60K 2015/03453* (2013.01); *B60K 2015/0775* (2013.01); *B60K 2015/0777* (2013.01)

(58) Field of Classification Search
CPC .......... B60K 2015/03453; B60K 2015/03144; B60K 2015/0777
USPC ...................................................... 220/564
See application file for complete search history.

(56) References Cited

U.S. PATENT DOCUMENTS

| | | | | |
|---|---|---|---|---|
| 2,794,569 | A * | 6/1957 | McCuen | B60K 15/073 220/564 |
| 5,449,029 | A * | 9/1995 | Harris | B60K 15/03519 137/202 |
| 6,607,005 | B2 * | 8/2003 | Viebahn | B60K 15/077 123/510 |
| 2002/0148510 | A1 * | 10/2002 | Viebahn | B60K 15/077 137/574 |
| 2008/0149199 | A1 * | 6/2008 | Bleuel | B60K 15/073 137/565.01 |
| 2009/0293607 | A1 * | 12/2009 | Bostrom | G01F 23/2962 73/290 V |
| 2010/0230415 | A1 * | 9/2010 | Eulitz | B29C 66/7234 220/562 |
| 2012/0097318 | A1 * | 4/2012 | Thompson | B60K 15/03177 156/91 |
| 2015/0053704 | A1 * | 2/2015 | Hill | B60K 15/03519 220/746 |
| 2016/0167508 | A1 * | 6/2016 | Jouie | B60K 15/03519 220/562 |
| 2018/0135574 | A1 * | 5/2018 | Pearce | F02M 37/0094 |
| 2018/0162220 | A1 * | 6/2018 | Kobayashi | B60K 15/03 |
| 2018/0304743 | A1 * | 10/2018 | Boecker | F02M 37/007 |
| 2019/0225112 | A1 * | 7/2019 | Zenner | B60K 6/28 |
| 2020/0064848 | A1 * | 2/2020 | Dudar | F02M 37/025 |
| 2020/0070648 | A1 * | 3/2020 | Moestam | F02M 37/103 |

OTHER PUBLICATIONS

International Preliminary Report on Patentability, International Application No. PCT/EP2016/075379, dated May 3, 2018, 5 pgs.

* cited by examiner

SADDLE TANK WITH SWASH BARRIER

RELATED APPLICATIONS

This application is a 35 U.S.C. § 371 national phase application of International Application No. PCT/EP2016/075379, filed on Oct. 21, 2016, which claims the priority of German Patent Application DE 10 2015 221 366.8, filed Oct. 31, 2015, the contents of which are incorporated herein by reference in their entirety.

FIELD

The present disclosure refers to a saddle tank for motor vehicles, having two chambers connected to one another in their upper region via a central portion having a reduced cross-section (e.g. tapered), wherein the first chamber has an access opening for fueling and wherein a fill level-limiting valve is arranged in the second chamber.

BACKGROUND

In a saddle tank with two chambers it often happens that in the chambers a different fuel level is present, for example due to swashing motions caused by dynamic driving conditions. A problem arises in a situation in which shortly before a planned refueling process, a larger quantity of fuel enters the second chamber and activates the fill level-limiting valve therein, for example due to an inclined position of the vehicle or due to lateral acceleration. The saddle tank may then be impossible to refuel since the fill level-limiting valve ensures a repeated interruption of the refueling process. This is particularly unwanted in the case of rented vehicles, which usually have to be completely refueled before returning the same, in order to avoid high additional fees for an only partially refueled vehicle. This problem could be avoided in that a fill level-limiting valve is also provided in the first chamber, which however causes an additional constructive effort and relatively high additional costs. An apparatus known from EP 2 653 333 A1 comprises a pivotable lid in the area of the central portion, which should allow a swash-over from the second chamber into the first chamber and the inflow of fuel from the first chamber into the second chamber during refueling while preventing a swash-over from the first chamber into the second chamber. It is presumed in this case that a swashing motion from the first to the second chamber represents a sudden event, while the flow rate during refueling is considerably lower. However, a precise coordination of the time, when the lid has to allow or prevent a swash-over, is difficult, and cannot be ensured in all situations. In case of a gradual inclined position, for example, the flow rate from the first to the second chamber may be so low that the lid is not actuated and the above undesired situation occurs. Moreover, a part disconnecting or moving from a carrier within the tank, such as a lever actuator, may lock the lid so that its function is disturbed.

SUMMARY

Based on this background, the present disclosure provides a saddle tank of above said type, in which an undesired transfer of fuel from the first to the second chamber is easily and reliably prevented.

The present disclosure is guided by the desire to avoid the use of movable parts for solving the problem, in order to prevent the drawbacks of the state of the art. The basic idea is thus to provide the position at which a desired overflowing from the first to the second chamber takes place during refueling, where an undesired swash-over or overflowing can be prevented from taking place. According to the present disclosure, a separating body is positioned between the two chambers, wherein the separating body has a separating wall which extends over the entire width of the central portion between an upper and a lower wall portion, and a pipe, which extends from an opening in the separating wall into the first chamber and which allows fluid communication between the first and the second chamber. The separating wall completely or at least substantially prevents a fluid exchange between both chambers, when a hermetic sealing is absent, while the opening of the pipe is arranged in the position where a rising level in the first chamber may enter the pipe during refueling and fuel may flow into the second chamber. However, swashing movements or a level in the first chamber, which is inclined towards the central portion, do not reach the opening of the pipe. No moving parts, which may wear out or become stuck, are provided. The pipe preferably extends essentially perpendicularly to the separating wall, thus in parallel to a liquid surface in a normal position of the tank or vehicle. The orientation and dimensioning of the pipe may be adapted specifically for each vehicle according to requirements. The passage cross-section of the pipe is advantageously selected in such a way that flow rates typical during refueling may flow through the pipe without causing backpressure.

The separating wall may be part of a carrier for fuel components, which is positioned within the saddle tank. Such carriers are provided within the tank for arranging valves, the passage of cables and similar. The separating wall may be integrally provided with such a carrier.

Alternatively, the separating wall may have at least one recess or aperture, through which it is arranged on a carrier for fuel components, which is arranged inside the saddle tank. The separating wall may then be fastened to the carrier by means of clips. Further passages may be provided for various cables and lines. The separating wall may be connected through an elastic element to the surrounding wall portions of the tank, so that no rigid coupling with the tank wall is present, which may negatively affect the mechanical stability of the tank, for example a certain deformability in case of accidents.

The separating wall and the pipe may be made of any suitable material, in particular an economic plastic material. No compatibility with respect to the material of the tank, such as for welding purposes, is required.

BRIEF DESCRIPTION OF THE DRAWINGS

The present disclosure is explained in the following by means of an exemplary embodiment, which is schematically shown in the drawings. In particular.

DETAILED DESCRIPTION

Figure 1:
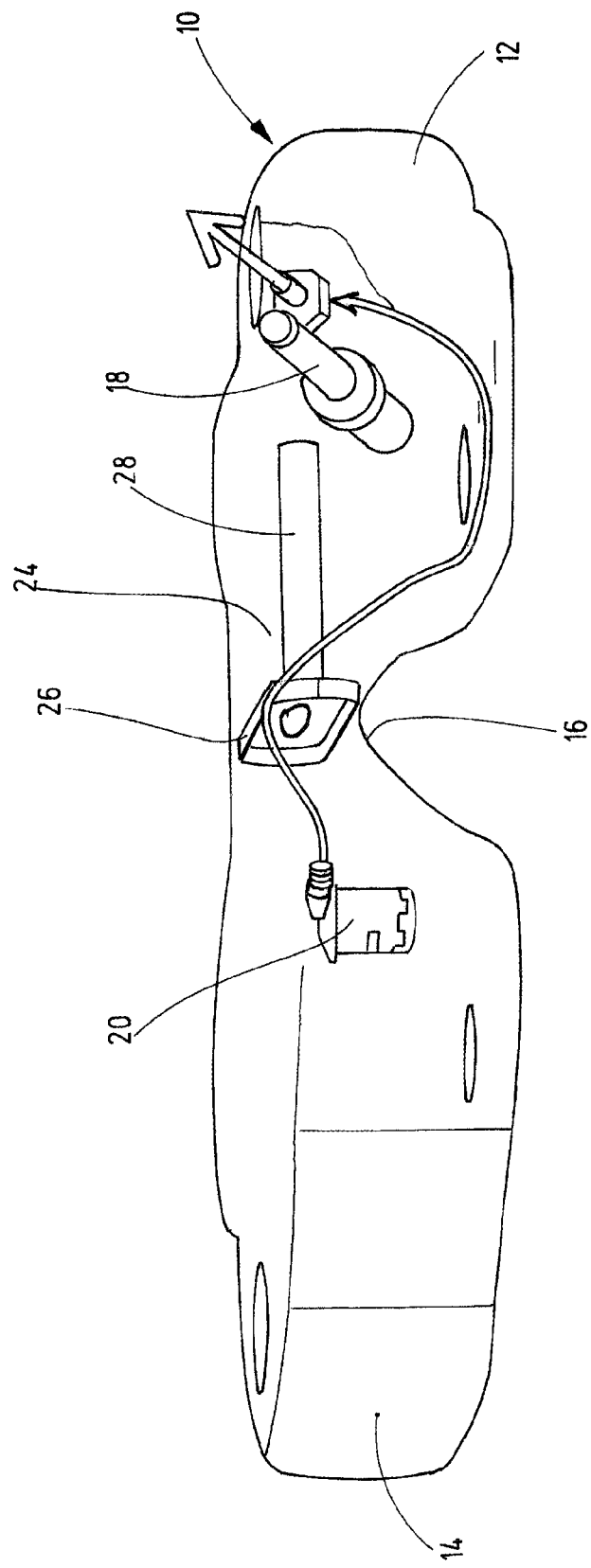
FIG. 1 shows a saddle tank in the unfilled condition with a separating body between the first and second chamber.

Now, a preferred embodiment of the present disclosure will be described in conjunction with the accompanying drawings. The sizes, materials, and other specific numerical values in the following description of the embodiment are simply by way of examples for ease of understanding of the present disclosure and should not be construed to limit the present disclosure unless otherwise specified. Note that in the description and the drawings, components having substantially the same functions and configurations are designated by the same reference characters, so that their description is not repeated, while components not directly relevant to the present disclosure are not shown.

The saddle tank 10 shown in FIG. 1 has a first chamber 12 and a second chamber 14, which are connected to each other in their upper regions by means of a central portion 16 having a reduced cross-section (e.g. tapered). A filling pipe 18 for filling the saddle tank 10 is connected to the first chamber 12. A fill level-limiting valve 20 (FLV, fill limit valve, or FLVV, fill limit vent valve) is positioned within the second chamber 14, wherein the valve interrupts a refueling process in a well-known manner if a predetermined fuel level is reached within the second chamber 14. The free space 22 between both chambers 12, 14, beneath the central portion 16, is provided for the passage of a drive shaft, in case of vehicles having an all-wheel drive or rear-drive, parts of the exhaust system and similar. In the region of the central portion 16 a separating body 24 is arranged, which is essentially composed of a separating wall 26 and a pipe 28, which is adjacent to an opening in the separating wall 26, not shown, and which extends into the first chamber 12.

The separating wall 26 closes the passage cross-section of the central portion 16 at least to an extent, that no significant liquid flow is possible through the same. The saddle tank 10 in FIG. 1 is in an unfilled condition.

Figure 2:
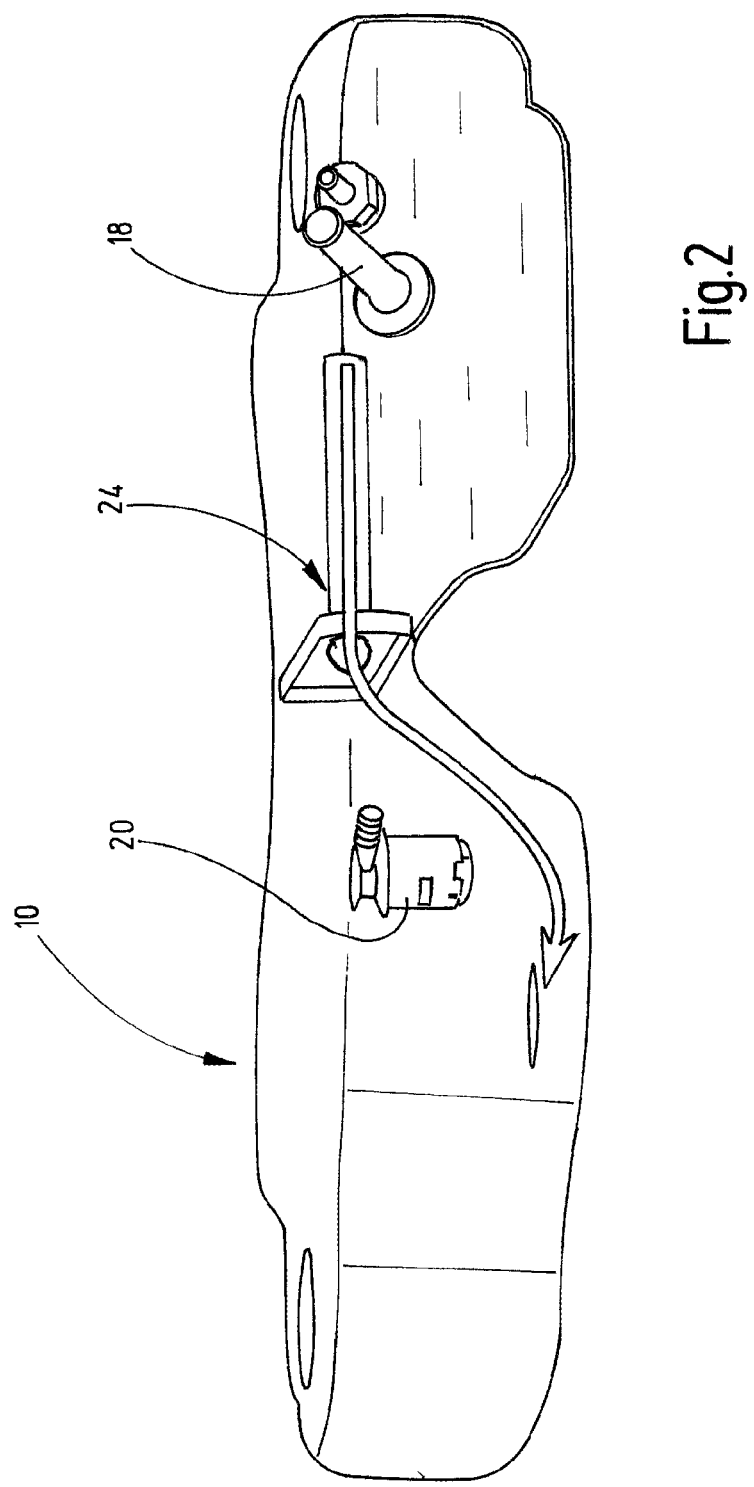
FIG. 2 shows the saddle tank of FIG. 1 in a partially filled condition.
Figure 3:
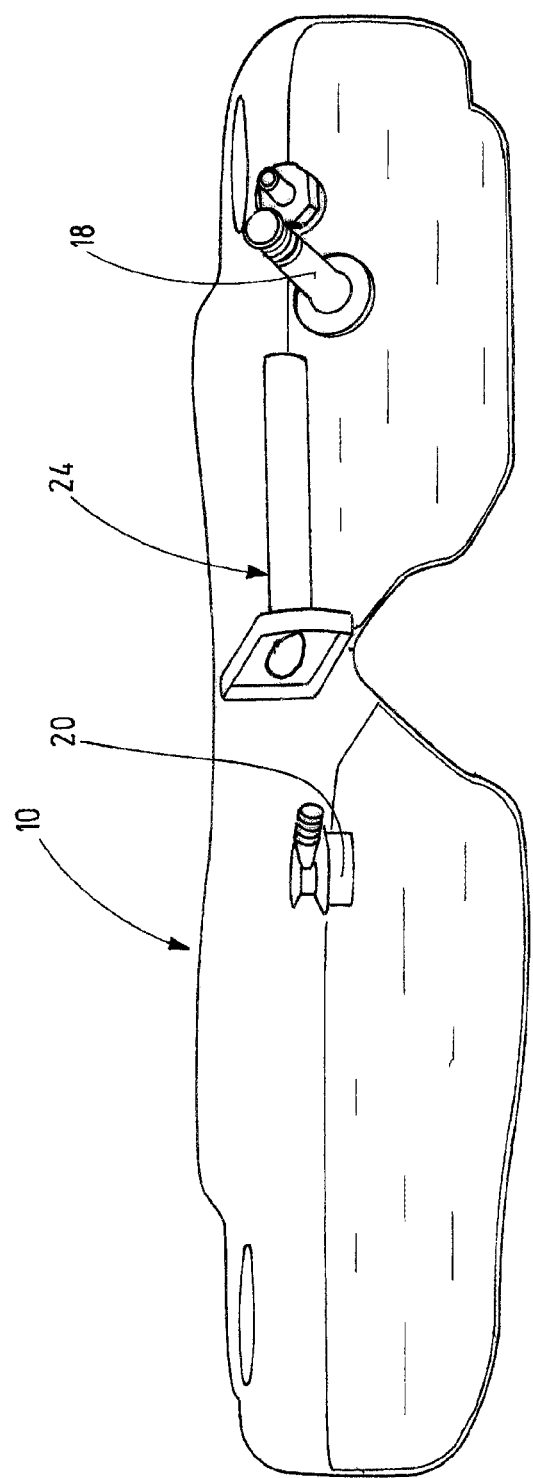
FIG. 3 shows the saddle tank of FIG. 1 in the completely filled condition.

FIG. 2 shows the saddle tank 10 during a refueling process at the time, when the fuel level within the first chamber 12 has risen to the level of the opening of the pipe 28 and fuel then flows through the pipe into the second chamber 14, until the level in the same reaches the triggering threshold of the fill level-limiting valve 20. This state is shown in FIG. 3. The opening cross-section of pipe 28 is dimensioned in such a way that it provides no significant resistance to the flow for filling the second chamber 14, so that the refueling process occurs as in a conventional saddle tank.

Figure 4:
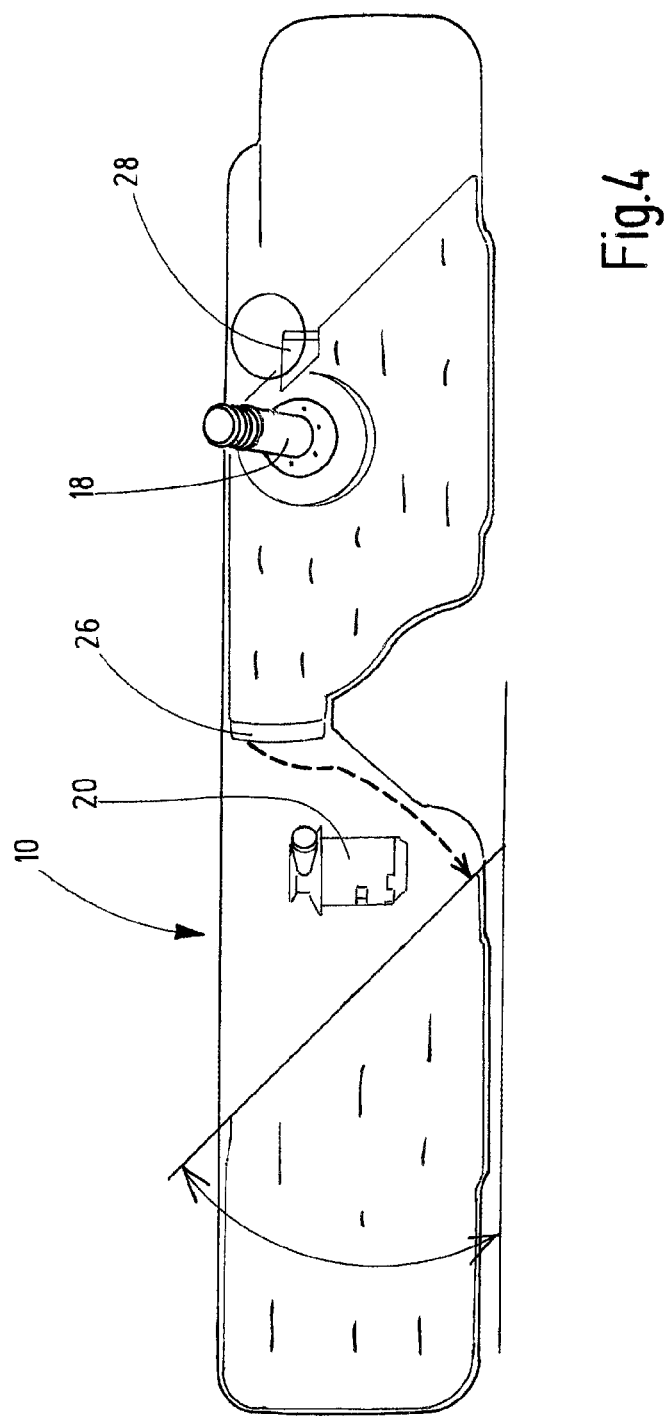
FIG. 4 shows the at least partially filled saddle tank of FIG. 1 in case of a strong lateral acceleration.

FIG. 4 shows the saddle tank 10 during a lateral acceleration, in which the fuel in chambers 12, 14 is displaced to the left. Liquid fuel builds up in the first chamber 12 at the separating wall 26 of the separating body 24, wherein the opening of pipe 28 protrudes within the free space, so that no liquid fuel may enter the second chamber 14 through pipe 28. The undesired swash-over of fuel into the second chamber 14, which may cause, during a successive refueling process, a premature or immediate triggering of the fill level-limiting valve 20, is thus prevented.

Figure 5:
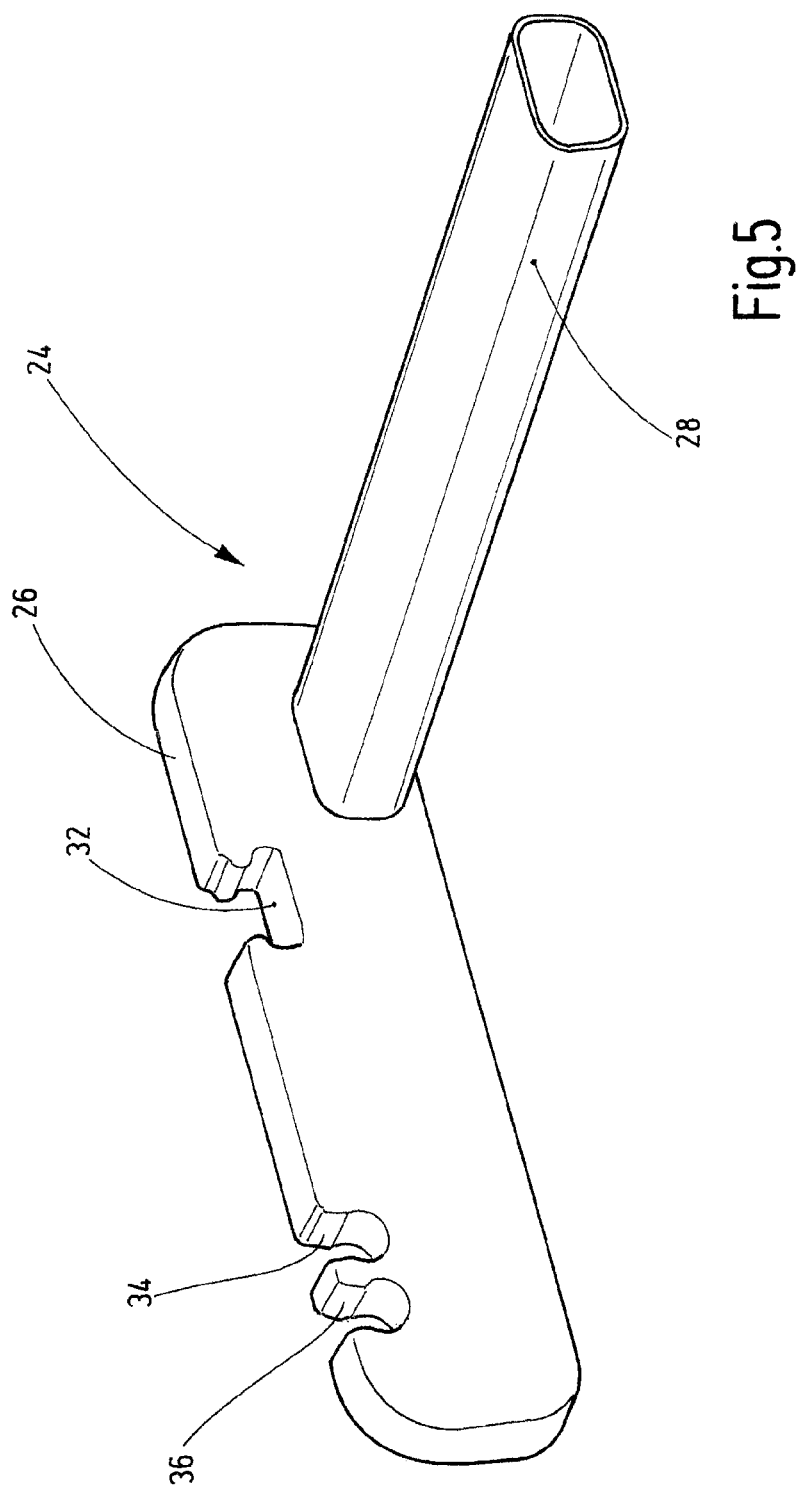
FIG. 5 shows a perspective view of the separating body.

FIG. 5 shows the separating body 24 with its separating wall 26 and the pipe 28 in an enlarged view. The separating wall 26 has a series of openings 32-36, which are provided for passage of various lines and cables and for connection to a component carrier, which is not shown in detail. Alternatively, the separating wall 26 may also be integrally formed with a component carrier. The openings (32-26) are dimensioned in such a way that they are substantially filled out by the associated complementary parts, so that no significant fuel quantities may flow through in the situation of FIG. 4.

In conclusion, the following may be stated: the present disclosure refers to a saddle tank 10 for motor vehicles, having two chambers 12, 14 connected to one another in their upper region via a central portion 16 having a reduced cross-section (e.g. tapered), wherein the first chamber 12 has an access opening 18 for refueling and wherein a fill level-limiting valve 20 is arranged in the second chamber 14. In order to prevent unwanted swash-over of fuel from the first chamber 12 into the second chamber 14, provision is made according to the invention for there to be arranged between the two chambers 12, 14, a separating body 24, which has a separating wall 26, which extends over the entire width of the central portion 16 between an upper and a lower wall portion, and a pipe 28 which extends from an opening in the separating wall 26 into the first chamber 12 and allows fluid communication between the first and the second chamber 12, 14.

The invention claimed is:

1. A saddle tank for motor vehicles, having two chambers connected to one another in their upper region via a central portion having a tapered cross-section, wherein the first chamber has an access opening for refueling and wherein a fill level-limiting valve is arranged in the second chamber, wherein a separating body is arranged between the two chambers and has a separating wall extending over the entire width of the central portion between an upper wall portion and a lower wall portion, wherein a pipe extends from an opening in the separating wall into the first chamber such that an end of the pipe is a free end and another end of the pipe is terminated at the separating wall, and allows fluid communication between the first chamber and the second chamber, and wherein the pipe protrudes into the first chamber such that its opening is disposed above a fuel level in the first chamber, which is inclined in the direction of or swashed toward the central portion in an inclined position of the saddle tank or during a strong lateral acceleration.

2. The saddle tank of claim 1, wherein the separating wall is part of a carrier for fuel components, which is arranged inside the saddle tank.

3. The saddle tank of claim 1, wherein the separating wall has at least one recess or aperture, through which it is arranged on a carrier for fuel components, which is arranged inside the saddle tank.

4. The saddle tank of claim 1, wherein the pipe extends substantially perpendicularly to the separating wall.

* * * * *